US006728286B2

United States Patent
Thorland et al.

(10) Patent No.: US 6,728,286 B2
(45) Date of Patent: Apr. 27, 2004

(54) METHOD OF JOINING MIRRORS TO RING LASER GYRO BLOCK ASSEMBLIES

(75) Inventors: Rodney H. Thorland, Shoreview, MN (US); Tom Ostertag, St. Paul, MN (US); Ron Ollestad, Elk River, MN (US); Tim Beckwith, Coon Rapids, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/213,782

(22) Filed: Aug. 7, 2002

(65) Prior Publication Data

US 2004/0028110 A1 Feb. 12, 2004

(51) Int. Cl.[7] ............................................. H01S 3/083
(52) U.S. Cl. ......................... 372/94; 372/107; 372/109
(58) Field of Search ........................... 372/94, 107, 109

(56) References Cited

U.S. PATENT DOCUMENTS

| | | | |
|---|---|---|---|
| 4,957,725 A | 9/1990 | Potember et al. | |
| 5,480,687 A | 1/1996 | Heming et al. | |
| 5,669,997 A * | 9/1997 | Robbert et al. | 156/101 |
| 5,960,025 A * | 9/1999 | Thorland et al. | 372/107 |
| 6,129,854 A * | 10/2000 | Ramsey et al. | 216/18 |
| 6,234,378 B1 | 5/2001 | Ford et al. | |
| 6,310,904 B1 | 10/2001 | Thorland et al. | |
| 6,346,305 B1 * | 2/2002 | Ramsey et al. | 428/34.1 |
| 6,428,896 B1 * | 8/2002 | Ramsey et al. | 428/428 |
| 2002/0174805 A1 * | 11/2002 | Terase et al. | 106/737 |

OTHER PUBLICATIONS

"Sol–Gel Glass," http://optoweb.fis.uniroma2.it/opto/sol-gel/, pp. 1–2, Jun. 22, 2002.
Huang et al., "Advances in Sol–Gel Technology," Ceramic Industry, pp. 1–8, Jun. 4, 2002.
Klein, "Sol–Gel Glass Technology, A Review," The Glass Industry, pp. 14–17, Jan. 1981.
Satoh, "Water glass bonding," Sensors and Actuators A72:160–168, 1999.

* cited by examiner

Primary Examiner—Paul Ip
Assistant Examiner—Leith A Al Nazer
(74) Attorney, Agent, or Firm—McDonnell Boehnen Hulbert & Berghoff

(57) ABSTRACT

A method of attaching at least one component to a ring laser gyro block. The method may include positioning the component so that a mounting surface of the at least one component is substantially parallel to a mounting surface of the ring laser gyro block and applying a fluid adhesive to the exposed interface of the mounting surface of the at least one component and the mounting surface of the ring laser gyro block. The method also includes allowing the fluid adhesive to harden.

2 Claims, 2 Drawing Sheets

METHOD OF JOINING MIRRORS TO RING LASER GYRO BLOCK ASSEMBLIES

BACKGROUND

1. Field of the Invention

This invention relates generally to bonding methods for use with materials such as glass, quartz, metal, ceramic and the like. More specifically, the invention relates to a method for bonding ring laser gyroscope mirrors to bodies of ring laser gyroscopes.

2. Description of Related Art

In one common form of compact ring laser gyroscope, a block comprising a glass, quartz, ceramic or similar material and having a low coefficient of thermal expansion (CTE) forms the body of the gyroscope. A number of components, typically composed of glass or metal, such as electrodes, mirrors, and readout apparatus, are attached to the gyroscope body. Sealed passages in the body allow communication among the various components. The passages of the gyroscope body are filled with a lasing gas that lases when current is applied to the gyroscope.

A cathode and two anode components are used to apply current; they are designed to create beams of laser light that travel in opposite directions through the gyroscope body. The cathode and anodes may be composed of aluminum, steel, nickel or other metals that meet the design requirements for the gyroscope. The other components attached to the gyroscope may be glass mirrors, or may be glass/metal assemblies that, for instance, allow adjustment of gyroscope mirror position to improve gyroscope performance.

The life and accuracy of the gyroscope is largely affected by the ability of the components to be properly bonded to the gyroscope body in such a way as to prevent escape of lasing gas or contamination of the gyroscope passages with foreign gasses. In an ideal case, the seal should be hermetic, meaning that a negligible amount of gas is exchanged between the passages in the gyroscope body and the atmosphere during the life of the gyroscope. Thus, the method used to seal the components to the gyroscope body is critical to the performance of the gyroscope.

The bonding method may also affect the operating range of the gyroscope, depending on the conditions under which the bonding materials degrade. Of particular concern are bonding materials having melting temperatures that limit the possible applications of the gyroscope (i.e. oil drilling, high speed/altitude aircraft, etc.). As another consideration, the bonding process and materials should not interfere with or alter previously completed processing steps, nor limit subsequent processing steps.

With these considerations in mind, numerous methods of bonding the components to the gyroscope body have been used, each with some measure of success. High-temperature epoxy, for example, has been used as an effective material for glass-to-glass bonds. Indium or other soft metals have been popular for glass-to-metal bonds. Both epoxy and indium have been effective in part because they are flexible enough to compensate for the differences in the CTE of the two materials being bonded. Other bonding methods, such as graded bonds and the use of glass frits, which attempt to match the CTE of the two materials to be bonded together, have also been successful.

Unfortunately, the epoxy and soft metal bonding techniques, due to the flexibility of the bond materials, tend to allow outgassing or fail to provide a bond capable of withstanding the pressures typically required for high-end gyroscopes. Indium, in particular, extrudes out of the bonding area with repeated use of the device, eventually causing failure of the gyroscope. Neither epoxy nor soft metal allow the gyroscope to be operated at high temperatures, since the limit of a gyroscope's range of operation is the melting temperature of the bonding material. In some cases, an even lower limit results if the bonding material begins to degrade below its melting temperature. These same factors will also affect the types of processing the gyroscope can withstand subsequent to formation of the bond.

Glass flits, which are used for bonding two identical materials or materials with nearly identical CTEs, require less cleaning and preparation of the bonding surfaces than required when forming indium seals. The use of glass frits is known to produce consistent and inexpensive hermetic seals. Unfortunately, the glass frit bonding process requires an elevated temperature which substantially limits the types of processing which can be done near the area of the bond prior to the bonding process. Furthermore, there is an inverse relationship between frit bonding temperature and the CTE for the frits used; frits with low CTEs (near those of typical gyroscope body materials) have such high processing temperatures that they exceed the thermal limits of the gyroscope body. Thus, use of frits usually introduces a thermal mismatch into the gyroscope since a compromise must be made between bonding temperature and the CTE of the frit.

Accordingly, a bonding method that can be implemented at relatively low temperature, that produces a high-temperature hermetic seal, and that requires less preparation, is needed.

SUMMARY OF THE INVENTION

In a first principal aspect, a method of attaching at least one component to a ring laser gyro block is disclosed. The method may comprise positioning the component so that a mounting surface of the at least one component is substantially parallel to a mounting surface of the ring laser gyro block and applying a fluid adhesive to the exposed interface of the mounting surface of the component and the mounting surface of the ring laser gyro block. Applying the fluid adhesive to the interface may cause it to wick into the interface. The method also includes allowing the fluid adhesive to harden. The fluid adhesive may be an aqueous silicate prepared using a sol-gel process, an aqueous sodium silicate, or another suitable adhesive.

In a second principle aspect, the method may further comprise establishing a gap of between about 0.0001 inches and about 0.015 inches between the mounting surface of the component and the mounting surface of the ring laser gyro block, wherein the fluid adhesive wicks into the gap.

In a third principle aspect, a ring laser gyro block assembly comprising a ring laser gyro block is disclosed, the assembly further comprising at least one component attached to the ring laser gyro block by a cured fluid adhesive. The component is attached by positioning it so that its mounting surface is substantially parallel to a mounting surface of the ring laser gyro block, and then applying a fluid adhesive to the interface of the mounting surface of the component and the mounting surface of the ring laser gyro block, wherein the fluid adhesive wicks between the mounting surfaces. The fluid adhesive is then allowed to harden.

These and other aspects of the present invention, as well as advantages of the invention, will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF AN EXEMPLARY EMBODIMENT

As described above, currently used methods and materials for attaching components to ring laser gyro blocks have distinct disadvantages, among them the need for labor-intensive preparation, and for high-temperature processing that may be harmful to some gyro components (which may also cause manufacturers to further restrict processing). Also, some bonds, such as those made at lower temperatures, may have shorter life cycles than other bonds.

Accordingly, exemplary and alternative exemplary embodiments of the present invention provide a method for attaching and sealing components to ring laser gyro blocks using a process that requires temperatures only somewhat higher (if at all) than room temperature, and that produces long-lasting hermetic seals that can withstand high temperatures. These advantages can be realized by allowing a fluid or gel adhesive to wick into the component-to-block interface. One adhesive that can be used is an aqueous sodium silicate, which hardens into a glass-like bond as water in the solution evaporates. Another possible adhesive is an aqueous silica sol-gel, which forms a bond similar to that of an aqueous sodium silicate. As used herein, the term "adhesive" means any fluid capable of wicking into an interface and hardening, by whatever means, thus producing a bond.

Embodiments of the present invention are particularly suited for use with the device and method for achieving beam path alignment of an optical cavity disclosed in U.S. Pat. No. 5,960,025, and with the measurement method to facilitate production of self-aligning laser gyroscope block disclosed in U.S. Pat. No. 6,310,904. The entirety of U.S. Pat. Nos. 5,960,025 and 6,310,904 are hereby fully incorporated by reference. Use of the exemplary embodiments of the present invention is also possible and practical with other ring laser gyro blocks and components as well.

Figure 1:
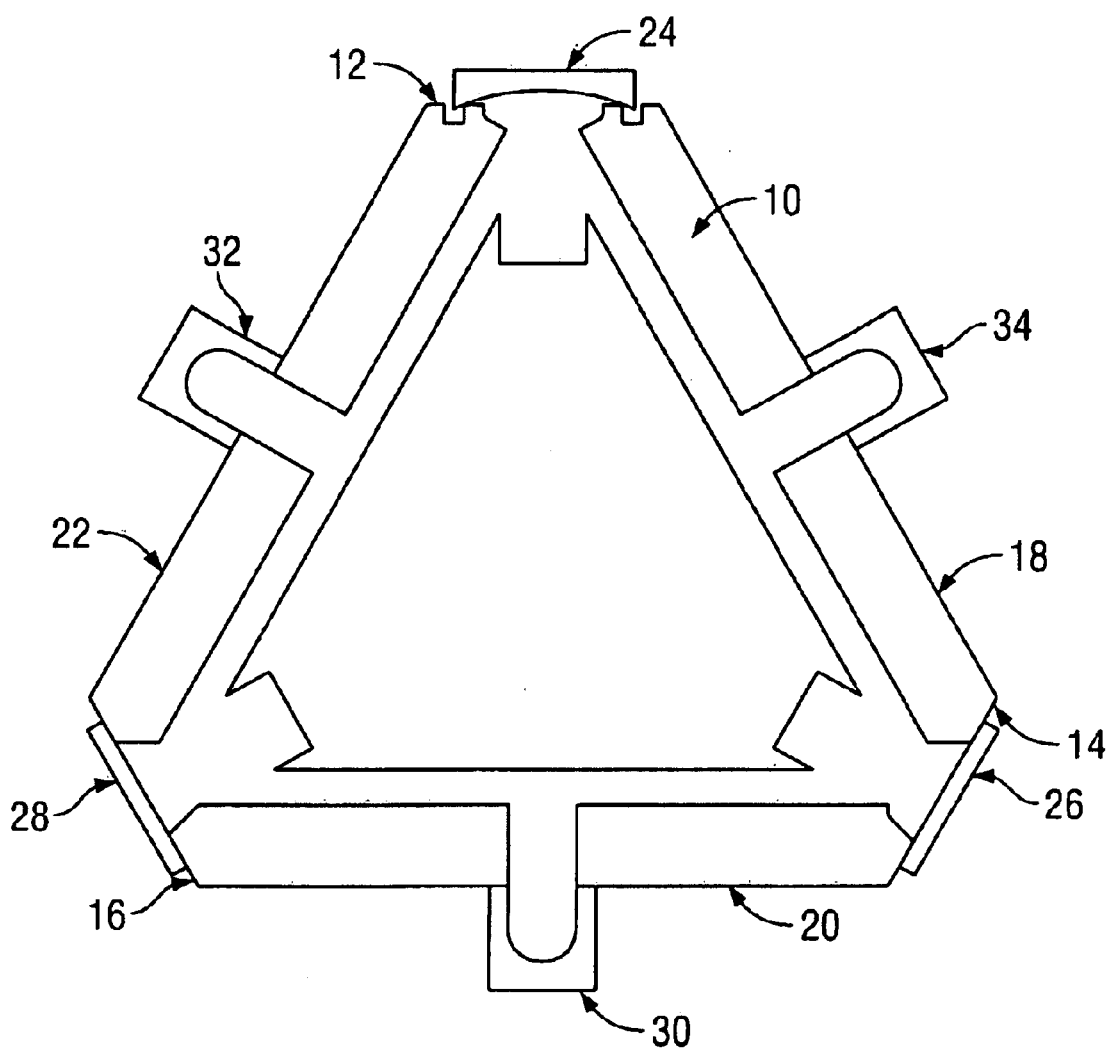
FIG. 1 shows a simplified cross-section of a ring laser gyroscope block assembly suited for application of the applicants' invention.

FIG. 1 shows a simplified cross-section of one form of ring laser gyroscope block assembly suited for application of the applicant's invention. For purposes of illustration, some components of the block assembly that may be required for operation, but not essential to the present invention, are not shown. Gyroscope body 10 is generally triangular. The gyroscope body 10 is formed of a glass or glass-like material, and may have a low CTE (coefficient of thermal expansion). Suitable body materials include the glass ceramic material marketed under the names "Cervit" and "Zerodur". A suitable glass material is marketed under the name "N-BK-7". Passages within the gyroscope body link openings in the gyroscope body at each corner. The corners of the gyroscope body are truncated to provide mating surfaces 12, 14, and 16 for a component at each corner. As will be described below, the mating surfaces 12, 14, and 16 may not necessarily be completely planar.

The opening at each corner allows optical communication between components. The sides of the gyroscope body provide three remaining mating surfaces 18, 20, and 22. In the gyroscope shown, mating surfaces 12, 14, and 16 have mirrors 24, 26, and 28, respectively, attached. Mirrors 24, 26, and 28 may be comprised of Zerodur or another suitable material. In a typical ring laser gyro, two of the mirrors may be concave, and the third (readout) mirror may be flat. A cathode 30 and anodes 32 and 34 may be mounted to mating surfaces 18, 20, and 22. The cathode and anodes may be mounted using the same method by which mirrors are attached, or they may be mounted using a different method. The cathode and anodes may be comprised of an aluminum-type material, and may be optically connected to each other and to the mirrors by sub-passages as shown.

According to the exemplary embodiment, mirrors and other components can be attached to the ring laser gyro body or "block" by allowing fluid adhesives to wick into interfaces between the components and the ring laser gyro body. The components and block may be held at a controlled gap distance to improve wicking, although a gap may not always be necessary; for example, if mating surfaces are etched rather than polished, fluid adhesive may readily wick into the interface even if the component and ring laser gyro block are held together.

Figure 2:
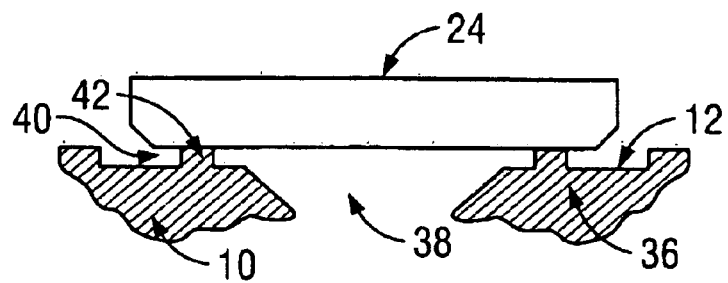
FIG. 2 is an expanded cross-section view of the one of the components and the gyroscope body according to the applicants' invention.

FIG. 2 shows in detail mirror 24 in mounting position relative to ring laser gyro block 10, although the following description is applicable to any other components that may be attached to a ring laser gyro block. A mirror mounting device 36 (which is described in greater detail in U.S. Pat. No. 5,960,025) may be used in accordance with the exemplary embodiment to position a mirror optically and to establish a "wicking gap" into which adhesive can wick or flow due to capillary action. Mirror mounting device 36 may be offset relative to the centerline of the opening 38 and may also be positioned so as to compensate for any irregularities in the ring laser gyro block, such as linear taper or curvature, or tilt of the critical mirror mounting surfaces. Mirror mounting device 36 can be machined into the truncated corner(s) of block 10 using a CNC machine. The recessed portion or "moat" of mirror mounting device 36, which comprises the block mounting surface of interface 40, is machined into mounting surface 12, resulting in a raised ring 42 formed interior to the moat. Mirror 24 may be flat or concave, although if concave it would still appear largely as illustrated due to the relatively large radius of curvature. The height of ring 42, and thus the corresponding wicking gap at interface 40, can be about 0.001 inches to about 0.010 inches, although other gaps (e.g., at least as small as 0.0001 inches and as large as about 0.015 inches) are possible. To reduce chipping, mirror 24 may include a chamfer at the outer edge as shown. For example, the chamfer may be a 45° chamfer at a distance of 0.010 inches from the edge of mirror 24. A chamfer may improve the wicking action that carries fluid into interface 40.

To attach mirror 24 to ring laser gyro block 10, the mirror may be placed into its final position (i.e., it is optically aligned) and held against raised ring 42, thus establishing a gap at interface 40 between the block and the mirror. With the mirror in position, a quantity of fluid solution may be applied using a small dauber or other device at one or more points around the circumference of mirror 24, indicated generally as interface 40. Capillary action or "wicking" then carries the fluid into the interface. Within a short time (a few minutes if using aqueous sodium silicate or aqueous silica sol-gel), the bond may be strong enough to allow careful handling. Optionally, an infrared heat lamp placed at a distance of about 8 inches from the bond may be used for about 2 minutes to "initially" cure the fluid adhesive. Microwave or other forms of radiation may also be used to initially cure the fluid adhesive.

If more components are to be attached to the ring laser gyro block, the above steps can be repeated until all components are in place and initially bonded to the ring laser gyro block, at which point the entire assembly can be baked at about 140° F. for about 4±1 hours prior to further processing of the ring laser gyro.

Figure 2A:
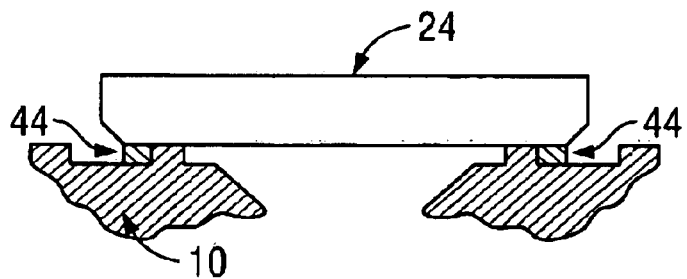
FIG. 2a shows the final structure created by an exemplary embodiment of the invention.

FIG. 2a illustrates mirror 24 after it has been bonded in place as described above. Cured adhesive 44 attaches and seals mirror 24 to ring laser gyro block 10. It is to be expected that some fluid adhesive will also have wicked into the interface between raised ring 42 (see FIG. 2) and mirror 24, depending on the finish of the interface surfaces.

Figure 2B:
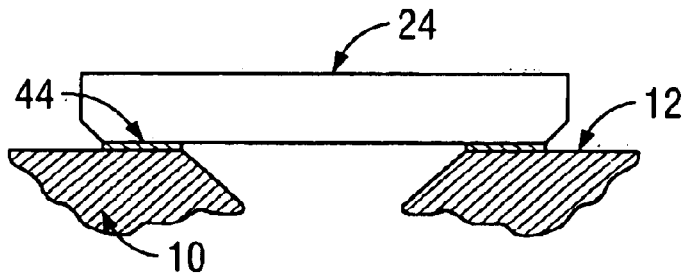
FIG. 2b shows the final structure created by an alternative exemplary embodiment of the invention.

FIG. 2b illustrates an alternative embodiment where mirror 24 is bonded to a surface of ring laser gyro block 10 that does not have a mirror mounting device (i.e., the mounting surface 12 is substantially planar). The method for this bond is the same as described above with reference to FIGS. 2 and 2a, although the structure is slightly different. The method is the same because fluid adhesive can wick into the component-to-block interface even without an established wicking gap, and cures to form a bond, as illustrated by cured adhesive 44 (the thickness of which is exaggerated for purposes of illustration. The mating surfaces can be etched with known etchants such as ammonium biflouride, hydrogen fluoride, and others. As with the embodiment of FIG. 2, a chamfer on the outside edge of the component's mounting surface may also improve wicking.

Exemplary embodiments of the present invention have been illustrated and described. It will be understood, however, that changes and modifications may be made to the invention without deviating from the spirit and scope of the invention, as defined by the following claims.

I claim:

1. A method of attaching and sealing at least one mirror to a ring laser gyro block, the ring laser gyro block and the at least one mirror comprising a ring laser gyro block assembly, the method comprising, in order, the following steps:

positioning the at least one mirror so that a mounting surface of the at least one mirror is substantially parallel to a mounting surface of the ring laser gyro block;

establishing a wicking gap of between about 0.0001 inches and 0.015 inches between the mounting surface of the at least one mirror and the mounting surface of the ring laser gyro block;

applying an aqueous sodium silicate solution to the wicking gap, wherein the aqueous sodium silicate solution wicks into the wicking gap;

hardening the aqueous sodium silicate solution by exposing it to infrared light; and allowing the aqueous sodium silicate solution to cure farther by baking the ring laser gyro block assembly.

2. A ring laser gyro block assembly comprising:

a ring laser gyro block;

a ring laser gyro block mounting surface, the surface having a raised ring; and at least one mirror attached to the ring laser gyro block by a cured aqueous sodium silicate, the at least one mirror attached by a method comprising;

establishing a wicking gap of between about 0.0001 inches and about 0.015 inches between the ring laser gyro block mounting surface and a mounting surface of the at least one mirror by positioning the at least one mirror so that the mounting surface of the at least one mirror is substantially parallel to the ring laser gyro block mounting surface, and so that the mounting surface of the at least one mirror contacts the raised ring;

applying an aqueous sodium silicate to the wicking gap, wherein the aqueous sodium silicate wicks into the wicking gap; and baking the assembly to harden the aqueous sodium silicate.

* * * * *